Feb. 13, 1951 — I. SAKS — 2,541,296
CLUTCH PLATE
Filed Dec. 27, 1948 — 2 Sheets—Sheet 1
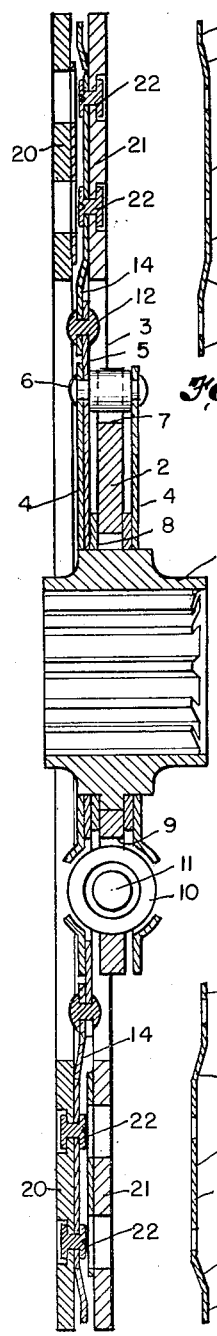
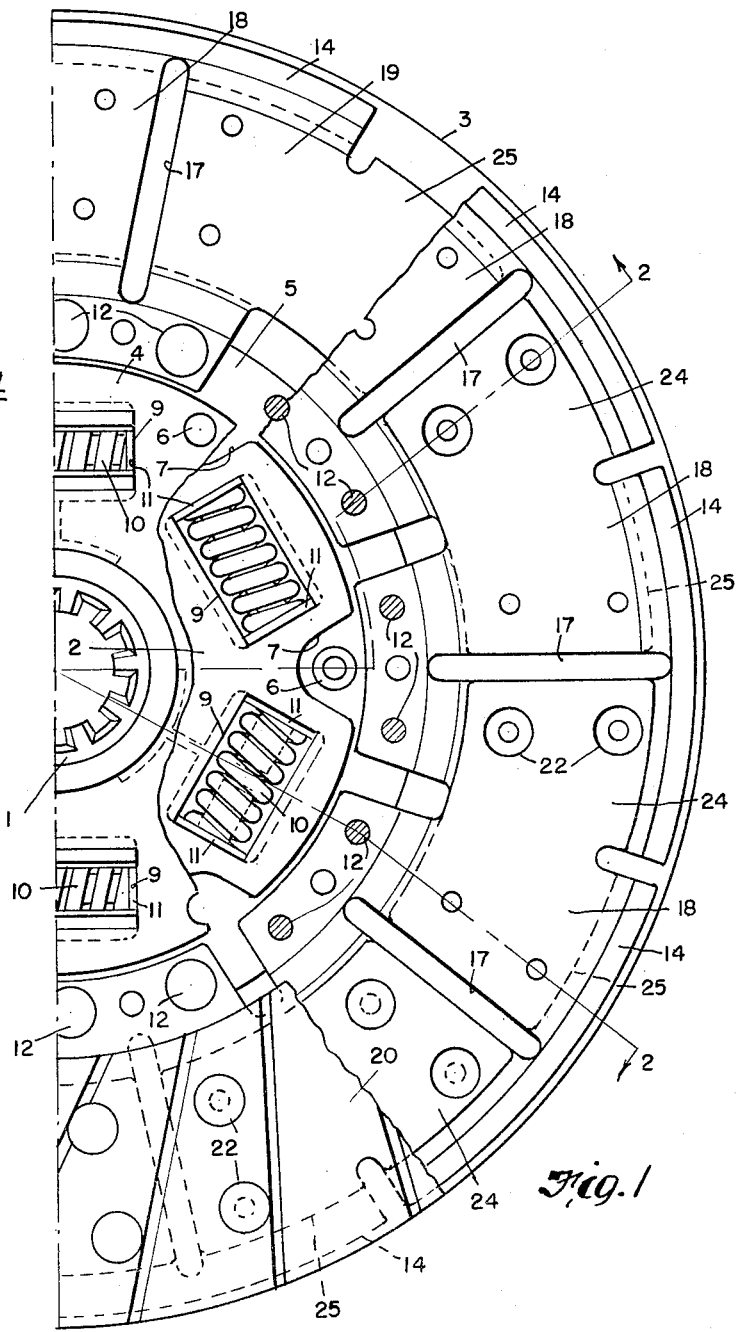
Fig. 4
Fig. 2
Fig. 5
Fig. 1
INVENTOR.
IRA SAKS
BY
Oberlin & Limbach
ATTORNEYS.

Feb. 13, 1951     I. SAKS     2,541,296
CLUTCH PLATE
Filed Dec. 27, 1948     2 Sheets-Sheet 2
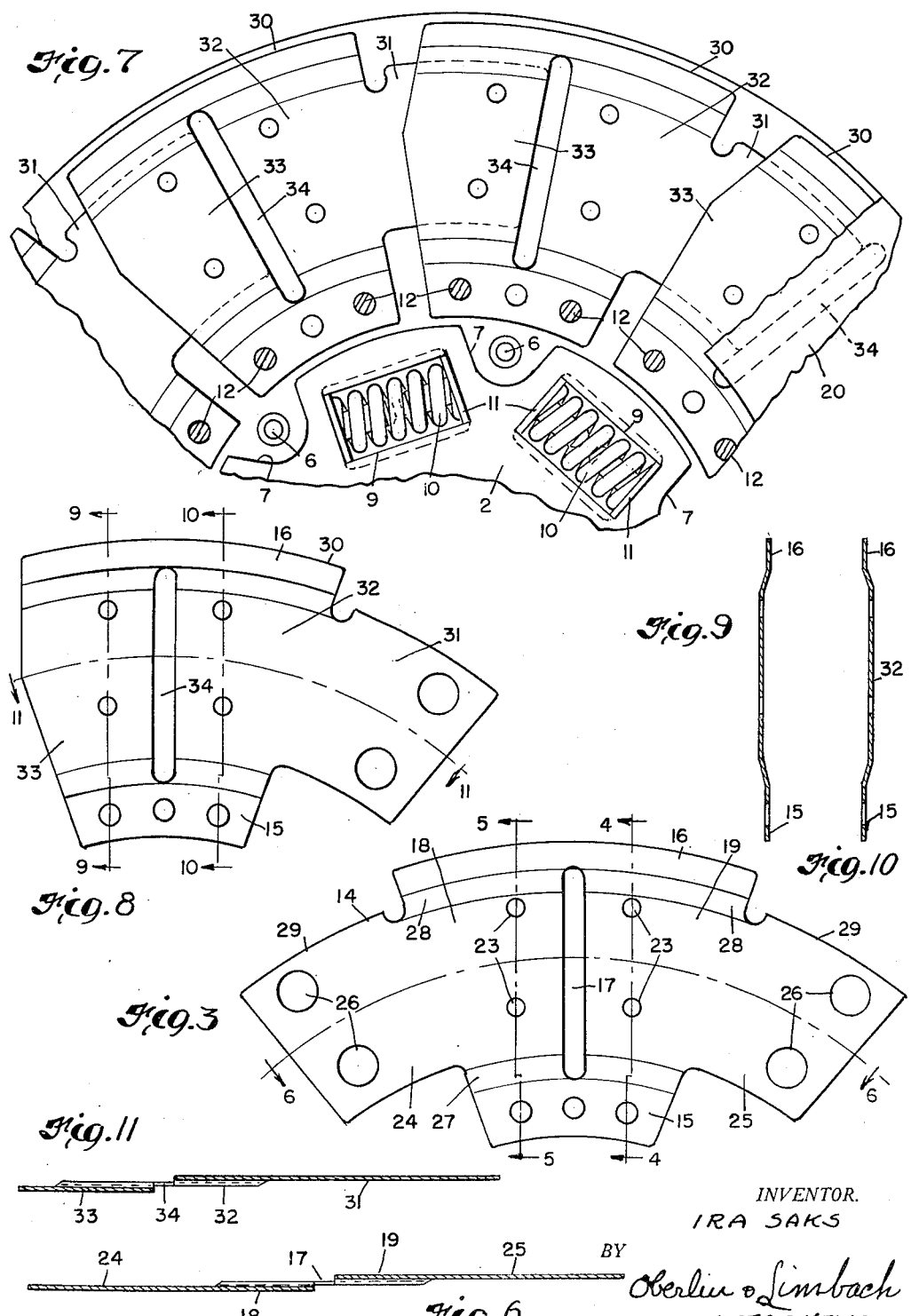
INVENTOR.
IRA SAKS
BY
Oberlin & Limbach
ATTORNEYS.

Patented Feb. 13, 1951

2,541,296

UNITED STATES PATENT OFFICE 2,541,296

CLUTCH PLATE

Ira Saks, Shaker Heights, Ohio

Application December 27, 1948, Serial No. 67,470

13 Claims. (Cl. 192—107)

The present invention while relating generally as indicated to clutch plates is more especially concerned with unique cushion mountings for the friction facing rings of clutch plates of the type widely used in automotive vehicle clutches whereby said rings may partake of cushioned axial movement when engaged between the flywheel and pressure plate members of such clutches. In this respect, the present invention is still more specifically concerned with certain improvements over the cushion mountings disclosed in the co-pending application of Daniel Kelleher, filed August 7, 1945, Serial No. 609,369, now Patent Number 2,502,653, issued April 4, 1950.

Hitherto, in clutch plates of the character referred to it has been a prevailing practice to provide a series of cushion members attached in circumferentially spaced relation around the disk body of the clutch plate, and formed to present two series of axially displaced areas to which the respective facing rings are attached, said members being of axially yieldable construction whereby the facing rings carried thereon may correspondingly yield and thus provide for smoother engagement of the clutch plate between the flywheel and pressure plate members of the clutch. However, such prior clutch plates are open to the objection that only a minor portion of each facing ring is backed-up by the cushion members for retention in flat form, thereby inducing uneven wear with localized areas subjected to excessive loads and undesirable distortion.

Accordingly, it is one principal object of this invention to provide means whereby a desired cushion mounting is attained through cushion members which provide areas for backing-up a greater portion of the circumferential extent of the facing rings attached thereto, thus avoiding the aforesaid objections.

Another object is to provide a cushioning means whereby the friction facing rings attached thereto will retain their desired flat form when under compression.

Still another object is to provide cushion members of a simple form fabricated from sheet metal stock to provide oppositely displaced portions and attached to the disk body of the clutch plate in an overlapping relationship whereby the facing rings attached to such displaced portions will be amply backed-up and supported in a flat form.

Other objects and advantages will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings—

Fig. 1 is a partial plan view of one embodiment of the present invention with a portion of the friction facing ring broken away in order to more clearly illustrate the cushion members thereunder;

Fig. 2 is a cross-section view taken substantially along the plane indicated by the line 2—2, Fig. 1;

Fig. 3 is a plan view of one of the segmental cushion members employed in the clutch plate illustrated in Fig. 1;

Figs. 4, 5, and 6 are cross-section views taken substantially along planes indicated by the lines 4—4, 5—5, and 6—6, respectively, of Fig. 3;

Fig. 7 is a partial plan view similar to Fig. 1 illustrating a modification;

Fig. 8 is a plan view of one of the segmental cushion members employed in the clutch plate illustrated in Fig. 7; and Figs. 9, 10, and 11 are cross-section views taken substantially along the planes indicated by the lines 9—9, 10—10, and 11—11, respectively, Fig. 8.

Referring now to the drawings and first more especially to Figs. 1-6 thereof, the clutch plate illustrated therein is of the so-called "cushion center" type comprising a hub 1 having a flange 2 fixed thereto and a disk body 3 rotatably mounted on said hub, said disk body comprising axially spaced cover plates 4—4, preferably identical, straddling said flange 2 and an intermediate plate 5 extending radially beyond said cover plates 4—4 and disposed between one cover plate 4 and said flange 2, said plates 4—4 and 5 being non-rotatably secured together as by the rivets 6 which extend through peripheral notches 7 formed in said flange 2. Such notches 7 are of size permitting a desired degree of relative rotation of disk body 3 and hub 1. Interposed between one cover plate 4 and said flange 2 and between said intermediate plate 5 and said flange 2 and encircling said hub 1 are a pair of spacer rings 8—8, which as evident are operative to preclude axial shifting of the disk body 3 and hub 1 relative to one another.

Said disk body 3 and flange 2 are further provided with a plurality of circularly arranged registering openings 9, in each of which openings is a compression spring 10 having seat members 11 at its ends engaged with the opposed walls of such openings, said springs operating as evident to resiliently oppose relative rotation of disk body 3 and hub 1 to thus cushion torsional shocks otherwise transmitted through the clutch.

Attached to the periphery of said intermediate plate 5 and on one side thereof, as by rivets 12 are a series of segmental cushion members 14 each of which, as best shown in Fig. 3, comprises a plate of segmental shape provided with radially spaced, flat and co-planar inner and outer areas 15 and 16 and with a radially extending slot 17 centrally therebetween. The portions 18 and 19 between such areas and on each side of such slot 17 are offset from each other whereby to present opposed substantially flat, axially spaced surfaces against which the respective friction facing rings 20 and 21 are adapted to be mounted as by the rivets 22 extending through the holes 23 formed in such portions 18 and 19.

Extending circumferentially from and lying in the same plane as the respective displaced portions 18 and 19 are the extensions 24 and 25 which are of a radial width substantially corresponding with the radial width of the flat areas of the portions 18 and 19 but preferably of slightly larger radius as shown and for a purpose later explained. Said extensions are formed with holes 26 therethrough for clearing the rivets which attach the facing rings to the portions 18 and 19.

With a series of said cushion members 14 attached on one side of said intermediate plate 5 and circumferentially adjacent one another as shown, irrespective of which side of the cushion members face outwardly, said extensions 24 and 25 of one cushion member will respectively overlap the portion 19 of the next adjacent cushion member and the portion 18 of the other adjacent cushion member. As shown, said extensions extend to the slot 17 of the adjacent cushion member.

Thus, when the friction facing rings 20 and 21 are respectively attached to the two series of flat surfaces presented by the displaced portions 18 and 19, said rings will be axially spaced apart and the areas of the rings between the series of portions 18 and between the series of portions 19 will be respectively backed-up by the extensions 24 and 25 therebetween. In this way each of the friction facing rings will be backed-up by a substantially continuous flat surface, except for the negligible areas opposite the slots 17, whereby axial loads on the rings will cause them to yieldably move toward one another and to retain a flat form during their entire axial movement with the loads thereon uniformly distributed. Said cushion members 14 are adapted to yield in the areas 27 and 28 whereby in a fully compressed state there will be a double thickness of the cushion members between said friction facing rings, viz. thicknesses of portions 18 plus extensions 25 and thicknesses of portions 19 plus extensions 24.

It will be observed that because the outer edges 29 of the extensions 24 and 25 are opposite the areas 28 along which the yielding of the cushion members takes place, such extensions cannot after initial yielding be displaced relative to the portions of which they constitute extensions except upon further yielding of the opposed displaced portions 18 and 19 of the adjacent cushion members. In this way, the loading on the friction facing rings 20 and 21 is more uniformly distributed and the friction facing rings retained in a flatter form than otherwise possible.

With respect to the clutch plate illustrated in Fig. 7, the principal feature of distinction from that illustrated in Fig. 1 resides in the cushion members and therefore repetition of the remaining details has been omitted except for identification of the same parts in Fig. 7 by the same reference numerals as used in Fig. 1.

In the clutch plate of Fig. 7 and as best shown in Fig. 8, each segmental cushion member 30 is the same as the cushion member 14 except that an extension 31 is provided on the displaced portion 32 only, the other portion 33 on the other side of slot 34 not being formed with such an extension. Thus, when a series of cushion members 30 is assembled onto the disk body 3 there will be overlapping of the portions 33 and extensions 31 of adjacent cushion members. As in the Fig. 1 construction, one facing ring will be attached to the series of portions 32 while the other friction facing ring will be attached to the series of portions 33 the former friction facing ring being backed-up by annular surface interrupted only by the slots 34. The extension 31 bears the same relation to the portion overlapped thereby whereby to function in the same manner as the extensions 24 and 25 previously described.

Having thus described two illustrative examples of the present improvements, it can be seen that the desired axial yielding of the friction facing rings is attained in a unique manner and at the same time such yielding is controlled within desired limits so that the facing rings will be backed-up by flat surfaces extending throughout a major portion of the circumferential extent of the friction facing rings whereby to be retained in flat form during cushioning movements thereof.

Other modes of applying the principle of the invention may be employed, change being made as regards the details described, provided the features stated in any of the following claims, or the equivalent of such, be employed.

I therefore particularly point out and distinctly claim as my invention:

1. A clutch plate comprising a disk body, a series of cushion members attached in circumferentially spaced relation to said body, each of said members comprising a plate divided by a generally radially extending slot therethrough into circumferentially adjacent oppositely displaced portions of which one portion circumferentially overlaps an oppositely displaced portion of an adjacent member, and friction facing rings respectively attached to such displaced portions of said members.

2. A clutch plate comprising a disk body, a series of cushion members attached in circumferentially spaced relation to said body, each of said members comprising a plate of segmental shape provided with radially spaced inner and outer co-planar areas, with a generally radially extending slot between such areas, with oppositely displaced portions on opposite sides of such slot presenting corresponding displaced faces lying in approximately parallel planes, and with a circumferential extension on one of such portions co-planar therewith and circumferentially overlapping an oppositely displaced portion on an adjacent member, and friction facing rings respectively attached to the two series of faces thus presented by said members.

3. A clutch plate comprising a disk body, a series of cushion members attached in circumferentially spaced relation to said body, each of said members comprising a plate of segmental shape provided with radially spaced inner and outer co-planar areas, with a generally radially extending slot between such areas, with oppositely displaced portions on opposite sides of such slot presenting corresponding displaced faces lying in approximately parallel planes, and with a circumferential extension on one of such portions co-planar therewith and circumferentially overlapping and substantially co-extensive with an oppositely displaced portion on an adjacent member, and friction facing rings respectively attached to the two series of faces thus presented by said members.

4. A clutch plate comprising a disk body, a series of cushion members attached in circumferentially spaced relation to said body, each of said members comprising a plate of segmental shape provided with radially spaced inner and outer co-planar areas, with a generally radially extending slot between such areas, with oppositely displaced portions on opposite sides of such slot presenting corresponding displaced faces lying in approximately parallel planes, and with circumferential extensions on such portions co-planar therewith and respectively circumferentially overlapping oppositely displaced portions of adjacent members, and friction facing rings respectively attached to the two series of faces thus presented by said members.

5. A cushion member for clutch plates comprising a plate of segmental shape provided with radially spaced co-planar areas, with a generally radially extending slot between such areas, with flat, oppositely displaced portions between such areas and on opposite sides of such slot, and with a circumferential extension on and co-planar with one of such portions, such extension having its circumferentially extending inner and outer edges respectively outward of and inward of the inner and outer edges of such radially spaced areas.

6. A cushion member for clutch plates comprising a plate of segmental shape provided with radially spaced co-planar areas, with a generally radially extending slot between such areas, with flat, oppositely displaced portions between such areas and on opposite sides of such slot, and with a circumferential extension on and co-planar with one of such portions, such extension having its circumferentially extending inner and outer edges respectively outward of and inward of the inner and outer edges of such radially spaced areas, the outer edge of such extension being outward beyond the outer edge of such one displaced portion.

7. A cushion member for clutch plates comprising a plate of segmental shape provided with radially spaced co-planar areas, with a generally radially extending slot between such areas, with flat, oppositely displaced portions between such areas and on opposite sides of such slot, and with opposite circumferential extensions on and co-planar with such portions respectively, such extensions having their circumferentially extending inner and outer edges respectively outward of and inward of the inner and outer edges of such radially spaced areas.

8. A cushion member for clutch plates comprising a plate of segmental shape provided with radially spaced co-planar areas, with a generally radially extending slot between such areas, with flat, oppositely displaced portions between such areas and on opposite sides of such slot, and with opposite circumferential extensions on and co-planar with such portions respectively, such extensions having their circumferentially extending inner and outer edges respectively outward of and inward of the inner and outer edges of such radially spaced areas, the outer edges of such extensions being outward beyond the outer edges of such displaced portions.

9. A cushion member for clutch plates comprising a plate of segmental shape provided with a generally radially extending slot and with flat circumferentially adjacent and oppositely displaced portions on opposite sides of such slot and with a flat circumferentially extending extension of less radial width than said member on and lying in the same plane as one of such portions, such extension extending circumferentially from that end of such one portion which is remote from such slot and having an inner edge radially outwardly offset from the inner edge of said plate.

10. A cushion member for clutch plates comprising a plate of segmental shape provided with a generally radially extending slot midway between its ends and with flat circumferentially adjacent and oppositely displaced portions of identical shape on opposite sides of such slot and with flat circumferentially extending extensions at opposite ends of less radial width than said member on and lying in the same plane as the respective displaced portions.

11. A clutch plate comprising a disc body, a series of cushion members having their inner edges attached in circumferentially spaced relation to the periphery of said body, each of said members comprising a plate divided radially beyond the periphery of said body into oppositely displaced and circumferentially adjacent, relatively axially yieldable portions of which one portion circumferentially overlaps and is normally axially spaced from an oppositely displaced portion of an adjacent member, and friction facing rings respectively attached to such displaced portions of said members, and yieldably supported thereby for limited axial movement toward each other as determined by engagement of such overlapped portions of said members with each other.

12. A clutch plate comprising a disc body, a series of cushion members having their inner edges attached in circumferentially spaced relation to the periphery of said body, each of said members comprising a plate divided radially beyond the periphery of said body into oppositely displaced and circumferentially adjacent, relatively axially yieldable portions of which one portion circumferentially overlaps and is substantially co-extensive with an oppositely displaced portion of an adjacent member to present a substantially continuous annular supporting surface for a friction facing ring, and friction facing rings respectively attached to such displaced portions of said members, and yieldably supported thereby for limited axial movement toward each other as determined by engagement of such overlapped portions of said members with each other.

13. A clutch plate comprising a disc body, a series of identical cushion members having their inner edges attached in circumferentially spaced relation to one side of the peripheral portion of said body, each of said members comprising a plate divided midway between its ends and radially beyond the periphery of said body into oppositely displaced and circumferentially adjacent relatively axially yieldable portions of the same shape which circumferentially overlap oppositely displaced portions of adjacent members, such overlapped portions of said members being normally axially spaced apart, and friction facing rings respectively attached to such displaced portions of said members, and yieldably supported thereby for limited axial movement toward each other as determined by engagement of such overlapped portions of said members.

IRA SAKS.

REFERENCES CITED

The following references are of record in the file of this patent:

UNITED STATES PATENTS

| Number | Name | Date |
|---|---|---|
| 1,945,382 | Saks | Jan. 30, 1934 |
| 2,102,279 | Pope | Dec. 14, 1937 |
| 2,221,800 | Johnson | Nov. 19, 1940 |
| 2,221,823 | Thelander | Nov. 19, 1940 |
| 2,339,430 | Saks | Jan. 18, 1944 |